United States Patent
Lee et al.

(10) Patent No.: US 7,679,882 B2
(45) Date of Patent: Mar. 16, 2010

(54) MULTILAYERED CHIP CAPACITOR AND CAPACITANCE TUNNING METHOD OF THE SAME

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/238,688

(22) Filed: Sep. 26, 2008

(65) Prior Publication Data
US 2009/0086405 A1    Apr. 2, 2009

(30) Foreign Application Priority Data
Sep. 28, 2007    (KR) .................. 10-2007-0098102

(51) Int. Cl.
*H01G 4/228* (2006.01)
(52) U.S. Cl. .............. 361/306.3; 361/306.1; 361/321.1; 361/321.2; 361/303; 361/313
(58) Field of Classification Search .............. 361/306.3, 361/306.1, 306.2, 311–313, 321.1, 321.2, 361/303–305, 307, 308.1, 301.1, 301.4
See application file for complete search history.

(56) References Cited

U.S. PATENT DOCUMENTS

| 6,266,229 B1 * | 7/2001 | Naito et al. ............. 361/306.3 |
| 6,381,117 B1 * | 4/2002 | Nakagawa et al. ....... 361/306.3 |
| 6,407,906 B1 * | 6/2002 | Ahiko et al. ............ 361/306.1 |
| 6,542,352 B1 * | 4/2003 | Devoe et al. ............ 361/321.2 |
| 6,754,064 B2 * | 6/2004 | Azuma et al. ............ 361/302 |

(Continued)

FOREIGN PATENT DOCUMENTS

EP    1 830 372 A1    9/2007

(Continued)

OTHER PUBLICATIONS

Korean Office Action issued in Korean Patent Application No. KR 10-2007-0098102, mailed Jan. 19, 2009.

*Primary Examiner*—Nguyen T Ha
(74) *Attorney, Agent, or Firm*—McDermott Will & Emery LLP

(57) ABSTRACT

There is provided a multilayer chip capacitor capable of tuning capacitance, including: a capacitor body where a plurality of dielectric layers are laminated; a plurality of pairs of first and second internal electrodes arranged alternately, while interposing a corresponding one of the dielectric layers; and a plurality of pairs of first and second external electrodes connected to the first and second internal electrodes, wherein the first and second internal electrodes include a plurality of groups each including at least one pair of the first and second internal electrodes, and the first and second internal electrodes of each of the groups are connected to different pairs of the first and second external electrodes, respectively, wherein a corresponding one of the pairs of the first and second external electrodes is selectively connected to power lines so that the multilayer chip capacitor has at least two different capacitances.

9 Claims, 5 Drawing Sheets

U.S. PATENT DOCUMENTS

| | | | |
|---|---|---|---|
| 7,019,958 B2 * | 3/2006 | Togashi et al. | 361/303 |
| 7,310,217 B2 * | 12/2007 | Takashima et al. | 361/306.3 |
| 7,420,796 B2 * | 9/2008 | Ota | 361/321.2 |
| 2006/0120017 A1 | 6/2006 | Togashi | |

FOREIGN PATENT DOCUMENTS

| | | |
|---|---|---|
| JP | 2000-331879 | 11/2000 |
| KR | 10-2006-0055384 | 5/2006 |
| KR | 10-2007-0053800 | 5/2007 |

* cited by examiner

MULTILAYERED CHIP CAPACITOR AND CAPACITANCE TUNNING METHOD OF THE SAME

CROSS-REFERENCE TO RELATED APPLICATIONS

This application claims the priority of Korean Patent Application No. 2007-98102 filed on Sep. 28, 2007, in the Korean Intellectual Property Office, the disclosure of which is incorporated herein by reference.

BACKGROUND OF THE INVENTION

1. Field of the Invention

The present invention relates to a multilayer chip capacitor, and more particularly, to a multilayer chip capacitor whose capacitance can be tuned by a user, and a method of tuning capacitance using a capacitance-tunable multilayer chip capacitor.

2. Description of the Related Art

In general, a multilayer chip capacitor (MLCC) has a structure such that internal electrodes of different polarities are laminated alternately, while interposing a corresponding one of a plurality of dielectric layers. This multilayer chip capacitor can be miniaturized while performing with high capacity and can be mounted easily, thus widely utilized as a part of various electronic products.

This multilayer chip capacitor is manufactured by a supplier under design conditions such as the laminated number of internal electrodes, and material for dielectric layers and thickness thereof to meet the international dimension and capacitance, and then provided to a user.

Therefore, the user should choose a multilayer chip capacitor of a predetermined capacitance befitting the purpose of use. Generally, even one electronic device requires multilayer chip capacitors having various capacitances. Thus, the user should purchase the multilayer chip capacitors in accordance with respective capacitances and mount the diverse multilayer chip capacitors in an assembly process. Moreover, the capacitor provided may have capacitance that is not precisely identical to the capacitance of a required capacitor. In this case, a capacitor with capacitance closest to the capacitance of the required capacitor is employed, which, however, undermines performance of the electronic product.

SUMMARY OF THE INVENTION

An aspect of the present invention provides a multilayer chip capacitor having a plurality of capacitances and formed of a single structure in which a user can directly select capacitance required under the use condition, out of the plurality of capacitances.

According to an aspect of the present invention, there is provided a multilayer chip capacitor capable of tuning capacitance, including: a capacitor body where a plurality of dielectric layers are laminated; a plurality of pairs of first and second internal electrodes arranged alternately such that the internal electrodes of different polarities oppose each other, while interposing a corresponding one of the dielectric layers in the capacitor body; and a plurality of pairs of first and second external electrodes formed on a surface of the capacitor body, wherein the first and second internal electrodes include a plurality of groups each including at least one pair of the first and second internal electrodes, and the first and second internal electrodes of each of the groups are connected to the pairs of the first and second external electrodes different from one another, respectively, wherein a corresponding one of the pairs of the first and second external electrodes is selectively connected to power lines so that the multilayer chip capacitor has at least two different capacitances.

To ensure two different capacitances to be designed more easily, the first and second internal electrodes of identical groups are stacked adjacent to one another.

The pair of the first and second internal electrodes belonging to the each group may be different in number. A corresponding one of the first and second internal electrodes belonging to the each group is connected to only one of the external electrodes having identical polarity.

The first and second external electrodes may be formed on both opposing surfaces of the capacitor body.

According to another aspect of the present invention, there is provided a method of tuning capacitance as a way to utilize the multilayer chip capacitor. The method includes: providing a capacitor including first and second internal electrodes arranged alternately, while interposing a corresponding one of dielectric layers, and a plurality of first and second external electrodes, wherein the first and second internal electrodes include a plurality of groups each including at least one pair of first and second internal electrodes, and the first and second internal electrodes of each of the groups are connected to different pairs of the first and second external electrodes from one another, respectively, wherein a corresponding one of the pairs of the first and second external electrodes is selectively connected to power lines so that the multilayer chip capacitor has at least two different capacitances; selecting the first and second external electrodes corresponding to a desired one of the at least two capacitances; and mounting the multilayer chip capacitor on a printed circuit board such that the selected first and second external electrodes are connected to the power lines provided on the printed circuit board.

The mounting the multilayer chip capacitor on a printed circuit board may include: the mounting the multilayer chip capacitor on a printed circuit board includes: providing a printed circuit board including a plurality of first and second mounting pads corresponding to the plurality of the first and second external electrodes, respectively and first and second power lines, wherein the first and second power lines are connected to only the first and second mounting pads corresponding to the selected first and second external electrodes out of the plurality of first and second mounting pads, and connecting the first and second external electrodes of the multilayer chip capacitor to the plurality of first and second mounting pads, respectively.

The selecting the first and second external electrodes corresponding to a desired one of the at least two capacitances may include selecting the first and second external electrodes excluding at least one of the plurality of the first and second external electrodes.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
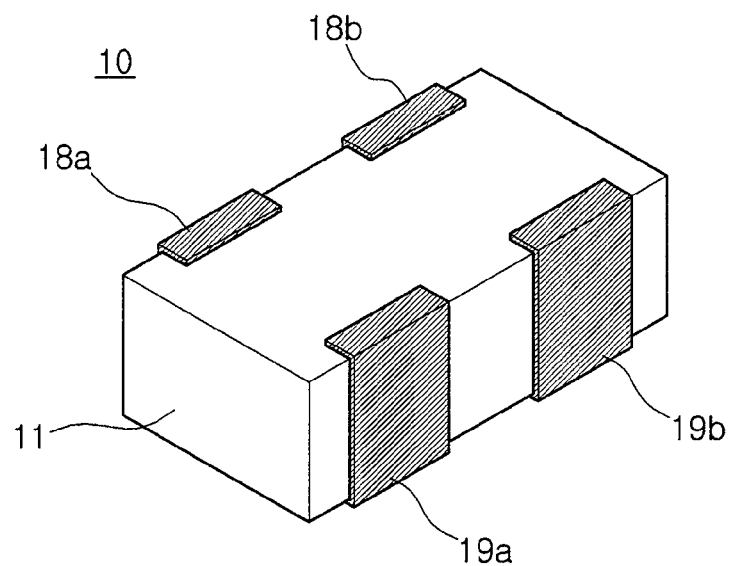
FIG. 1 is a perspective view illustrating a multilayer chip capacitor according to a first embodiment of the invention.

FIG. 1 is a perspective view illustrating a multilayer chip capacitor according to a first embodiment of the invention.

Referring to FIG. 1, the multilayer chip capacitor 10 of the present embodiment includes a capacitor body 11 where a plurality of dielectric layers (11' of FIG. 2) are laminated.

In the present embodiment, the multilayer chip capacitor 10 includes two first external electrodes 18a and 18b and two second external electrodes 19a and 19b formed on opposing side surfaces to be electrically insulated from each other. As illustrated, the first and second external electrodes 18a and 18b; 19a and 19b are disposed on the opposing side surfaces to have identical polarity. Contrarily, to reduce equivalent series inductance (ESL), the first and second external electrodes 18a and 18b; 19a and 19b may be arranged such that adjacent ones of the external electrodes have opposite polarities.

Figure 2:
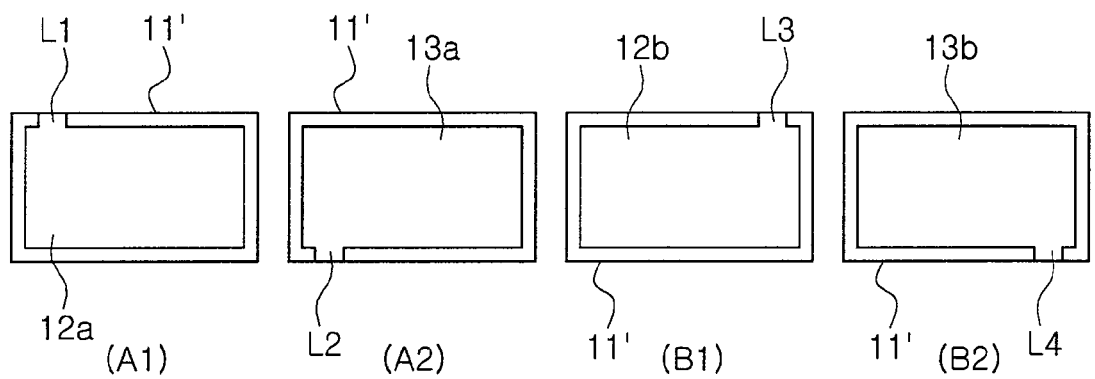
FIG. 2 is a plan view illustrating first and second internal electrodes applicable to the multilayer chip capacitor shown in FIG. 1.

The multilayer chip capacitor 10 shown in FIG. 1 may include first internal electrodes 12a and 12b and second internal electrodes 13a and 13b shown in FIG. 2.

The plurality of first and second internal electrodes 12a, 13a, 12b, and 13b are arranged to have different polarities alternating while interposing a corresponding one of the dielectric layers 11'.

The first and second internal electrodes 12a, 13a, 12b and 13b shown in FIG. 2 are formed of one pair, respectively. But as easily apparent to those skilled in the art, in actual applications, the internal electrodes of each of groups (A1), (A2), (B1), and (B2) may be formed of a plurality of pairs.

Each of the first internal electrodes 12a and 12b belonging to each of the groups (A1) and (B1) is connected to a corresponding one of the first external electrodes 18a and 18b. Similarly, each of the second internal electrodes 13a and 13b belonging to each of the groups (A2) and (B2) is connected to a corresponding one of the external electrodes 19a and 19b.

As described above, each of the first and second internal electrodes 12a and 13a; 12b and 13b belonging to the group may be connected to a corresponding one of the first and second external electrodes 18a and 18b; 19a and 19b through one lead L1, L2, L3, or L4.

In this connection structure, when all the first and second external electrodes are connected to power lines, all of the internal electrodes are activated to allow the multilayer chip capacitor to exhibit predetermined capacitance, i.e., a maximum value.

In contrast, in a case where at least one of the first and second external electrodes is not connected to a power line, the internal electrode connected to the at least one external electrode is not activated so that the multilayer chip capacitor may have different capacitance. That is, in a case where only some portions of the first and second external electrodes are selectively connected to the power lines, only the first and second internal electrodes belonging to the group connected to the first and second external electrodes are activated so that the multilayer chip capacitor correspondingly demonstrates different capacitance, i.e., lower capacitance than a case where all of the external electrodes are connected.

FIGS. 3A to 3D are schematic views for explaining a method of tuning capacitance in the multilayer chip capacitor according to a first embodiment of the invention.

FIG. 3 illustrates a printed circuit board 21 having a multilayer chip capacitor 10 mounted thereon.

Four mounting pads 22a, 22b, 23a, and 23b are provided on an area corresponding to the first and second external electrodes 18a and 18b; 19a and 19b of the multilayer chip capacitor 10. The four mounting pads 22a, 22b, 23a, and 23b have the first and second external electrodes 18a, 18b, 19a, and 19b soldered thereto, respectively.

In the present embodiment, the connection between power lines and the external electrodes is determined by the connection between the power lines and the mounting pads. That is, all of the external electrodes of the multilayer chip capacitor are soldered to the mounting pads, respectively but the power lines are selectively connected to the respective mounting pads to utilize at least some of the external electrodes as a substantial external terminal.

Under this connection configuration, the external electrodes are soldered to the four mounting pads to thereby support the multilayer chip capacitor stably while only desired ones of the external electrodes can be selectively connected to the power lines.

Figure 3A:
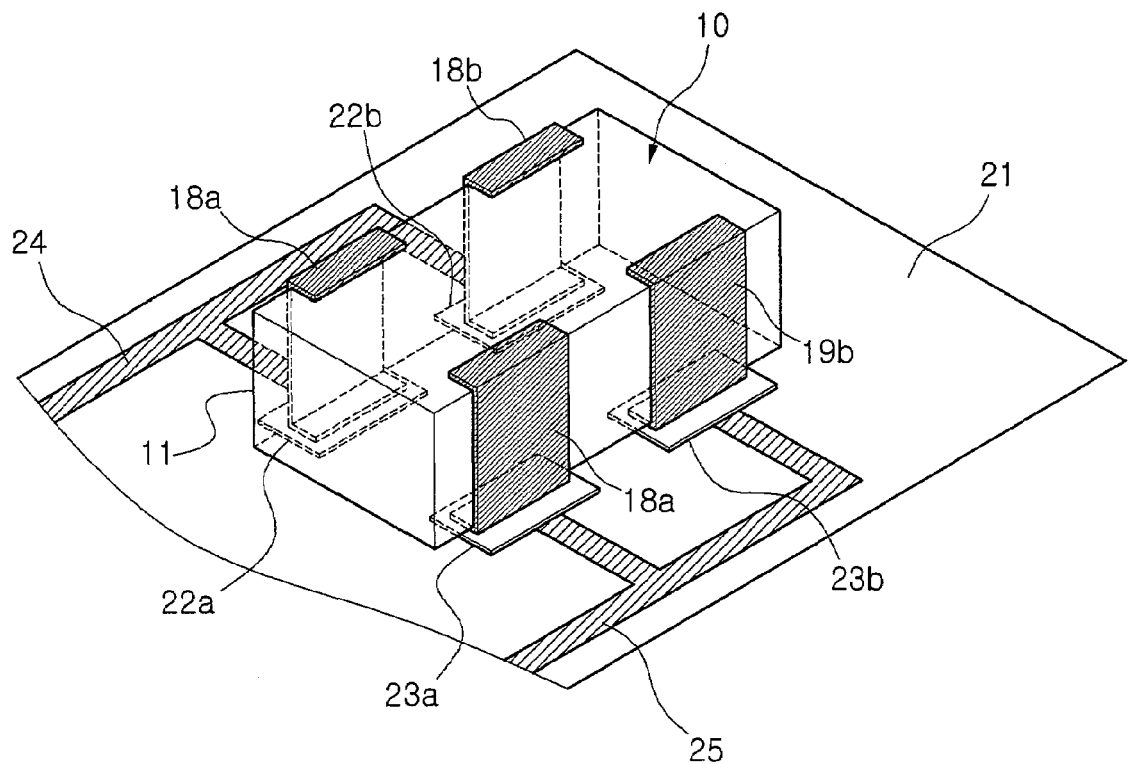
FIGS. 3A to 3D are perspective views illustrating connection configuration of a power line for explaining a method of tuning capacitance using the multilayer chip capacitor shown in FIG. 1.

As shown in FIG. 3A, the first and second power lines 24 and 25 of the board 21 are connected to corresponding ones of the four mounting pads 22a, 22b, 23a, 23b, respectively. That is, the first power line 24 is connected to the first mounting pads 22a and 22b and the second power line 24 is connected to the second mounting pads 23a and 23b. This allows the internal electrodes of all groups (A1), (A2), (B1), and (B2) connected to the first and second external electrodes 18a and 18b; 19a and 19b to be activated so that the multilayer chip capacitor can exhibit the biggest capacitance.

Figure 3B:
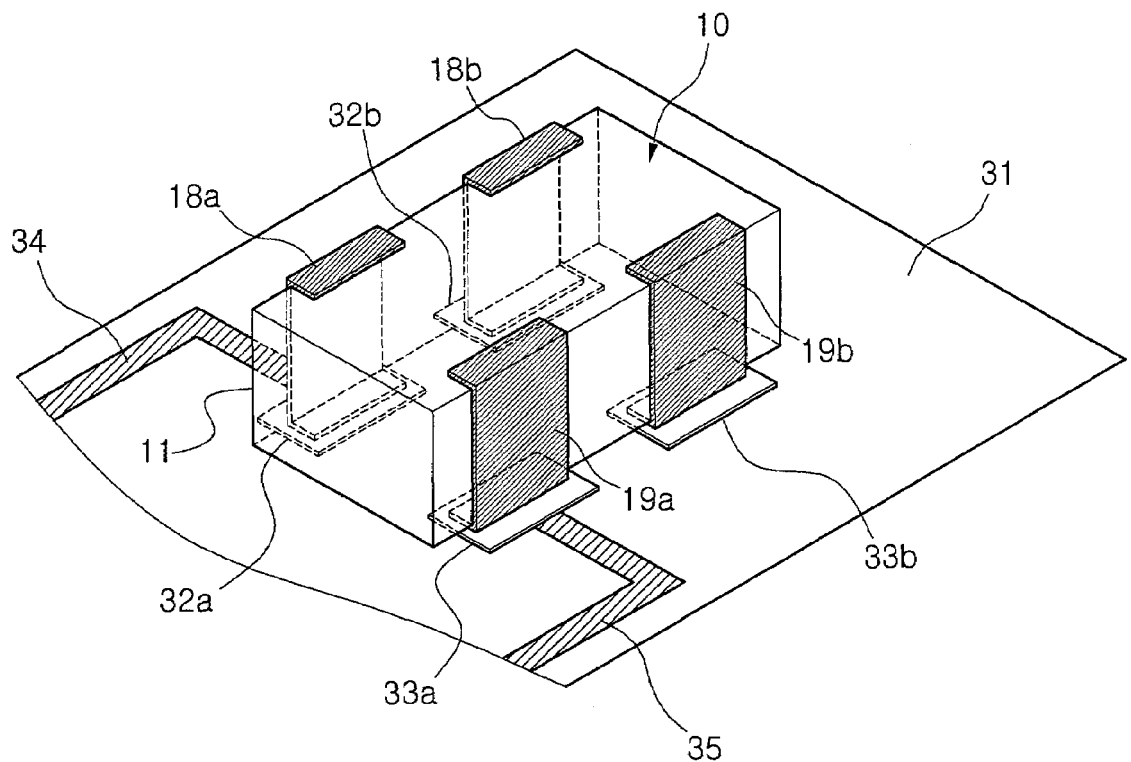

Contrarily, as shown in FIG. 3B, first and second power lines 34 and 35 of the board 31 are connected to only a corresponding one 32a and 33a of the first and second mounting pads 32a and 32b; 33a and 33b, respectively. That is, the first power line 34 is connected to the first mounting pad 32a and the second power line 35 is connected to the second mounting pad 33a.

In this case, the first and second external electrodes 19a and 19b are not connected to the power lines, and thus the first internal electrode 12b of group (B1) connected to the first and second external electrodes 19a and 19b and the second internal electrode 13b of group (B2) cannot be activated, thereby not serving to increase capacitance.

As a result, compared to FIG. 3A, the multilayer chip capacitor experiences a decrease in total capacitance commensurate with capacitance relating to the internal electrodes not connected to the power lines.

Even though the external electrodes with corresponding polarity are connected to the power lines in an identical number, respectively, different combination of the external electrodes may be employed to allow the multilayer chip capacitor to achieve different capacitances. This connection configuration is shown in FIG. 3C.

Figure 3C:
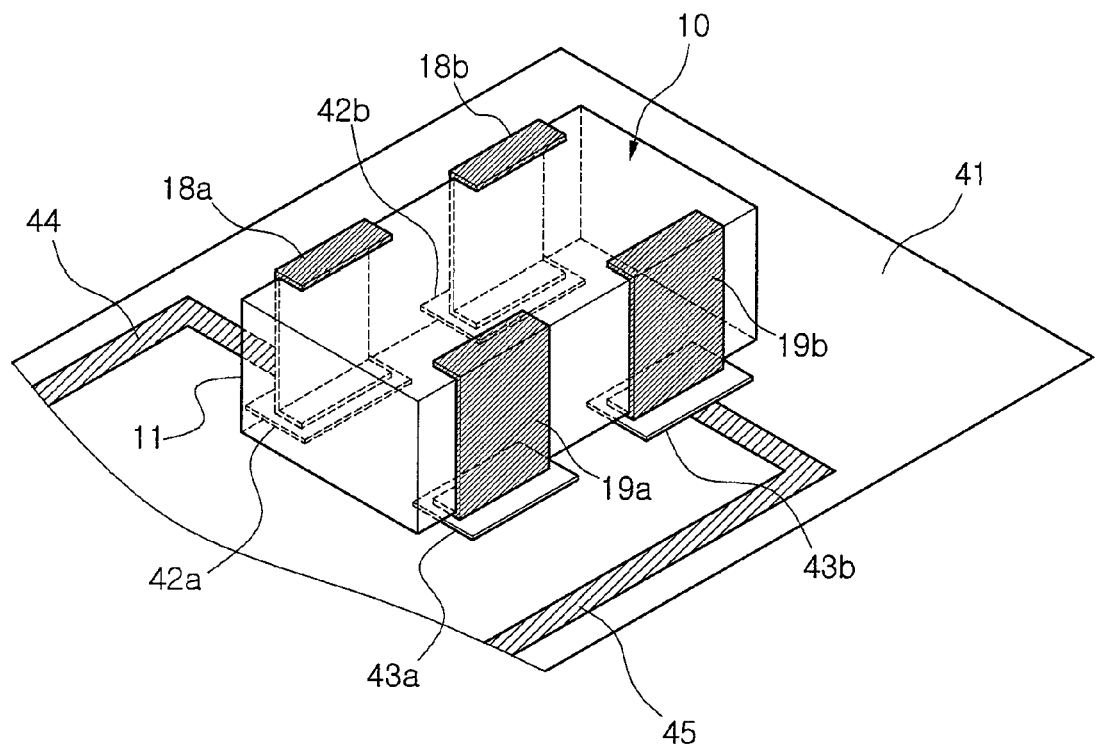

As shown in FIG. 3C, first and second power lines 44 and 45 of a board 41 are connected only to a corresponding one 43a of two first mounting pads 42a and 42b and another corresponding one 43b of two second mounting pads 43a and 43b, respectively.

As described above, the number of the first and second external electrodes connected to the power lines is identical to the number of FIG. 3B. However, in place of one 19a of the first and second external electrodes selected in FIG. 3B, another external electrode 19b may be selectively connected to the power line 45 to change capacitance. This change in capacitance is effected because the internal electrodes may be activated in different positions and a different number of internal electrodes may belong to each group.

Figure 3D:
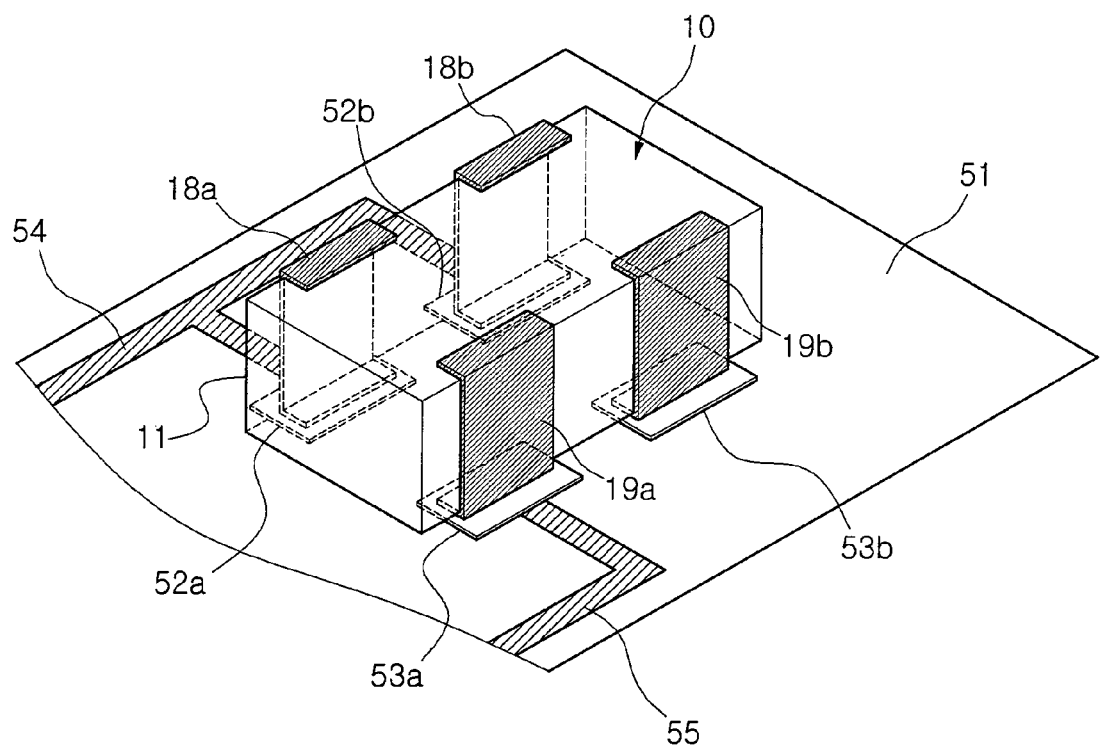

Moreover, in a board 51 shown in FIG. 3D, a first power line 54 is connected to two first mounting pads 52a and 52b and a second power line 55 is connected to only one mounting pad 53a.

This allows for activation of all of the internal electrodes 12a, 12b, 13a and 13b except for only the second internal electrode 13b connected to the second external electrode 19b, thereby serving to improve capacitance. As a result, the multilayer chip capacitor of FIG. 3D exhibits capacitance substantially lower than the capacitance of the multilayer chip capacitor shown in FIG. 3A, and capacitance higher than the capacitance of the multilayer chip capacitor shown in FIG. 3C.

As described above, according to the connection configuration of the external electrodes, the multilayer chip capacitor of the present embodiment may have different capacitances. Also, the internal electrodes can be adequately designed in the lamination order and numbers to ensure that a plurality of capacitances determined according to the connection between the external electrodes and the power lines are used as a frequent capacitance. Accordingly, this enables diverse multilayer chip capacitors with different capacitances to be replaced with one chip.

As described above, the capacitance of the present embodiment may be set under various design conditions such as area of the internal electrodes, material for dielectric layers and thickness thereof. But to achieve each capacitance more simply, the lamination number and order of the internal electrodes of each group may be changed over the other conditions.

More specifically, predetermined capacitance can be achieved in somewhat different ways by changing the lamination order of the internal electrodes, and a capacitor with appropriate capacitance can be designed according to the following equation.

The following equation is premised that the internal electrodes of each group are identical in area thereof, and materials and thickness of the dielectric layers between the internal electrodes are also identical.

In the first and second internal electrodes shown in FIG. 2, in a case where the internal electrodes are laminated in an order of A1-B1-A2-B2-A1-B1-A2-B2 . . . , capacitances defined by equations noted in Table 1 can be attained.

In this arrangement, it is construed that when the first and second internal electrodes pair with each other for each group, the pairs of the first and second internal electrodes belonging to one group are stacked alternately with the pairs of the first and second internal electrodes belonging to another group, respectively.

When the first and second internal electrodes of each group are laminated in a repeated number of N and adjacent ones of the first and second internal electrodes have unit capacitance of $C_1$, capacitances can be derived based on the equations noted in Table 1 below.

TABLE 1

| Example of connection between external electrodes and power lines | Equations for capacitances |
| --- | --- |
| FIG. 3A | $4(N-1)C_1$ |
| FIG. 3B | $NC_1 + (N-1)C_1/3$ |
| FIG. 3C | $(N-1)C_1 + NC_1/3$ |
| FIG. 3D | $(2N-1)C_1$ |

Based on the equations shown in Table 1, the appropriate lamination order and number can be selected to design a multilayer chip capacitor with desired capacitance.

On the contrary, in the first and second internal electrodes shown in FIG. 2, when the internal electrodes are laminated in an order of A1-B1-A1-B1- . . . -A2-B2-A2-B2-A2-B2 . . . , capacitance can be derived based on the equations noted in Table 2 below.

In this arrangement, it is construed that when the first and second internal electrodes pair with each other for each group, the pairs of the first and second internal electrodes belonging to one group are stacked successively and the pairs of the first and second internal electrodes of another group are stacked successively thereon.

When the first internal electrodes of group (A1) and the second internal electrodes of group (B1) are laminated in a repeated number of X, the first internal electrodes of group (A2) and the second internal electrodes of group (B2) are laminated in a repeated number of Y, and adjacent ones of the first and second internal electrodes have unit capacitance of $C_1$, capacitances can be derived based on the equations noted in Table 2 below.

TABLE 2

| Examples of connection between external electrodes and power lines | Equations for capacitances |
| --- | --- |
| FIG. 3A | $(X+Y-1)C_1$ |
| FIG. 3B | $(X-1)C_1$ |

Based on the equations shown in Table 2, an appropriate lamination order and number can be selected to design a multilayer chip capacitor with desired capacitance.

As described above, the internal electrodes stacked successively in an order of predetermined groups allow the equations for the capacitances to be simply expressed. This beneficially assures easier design in achieving desired capacitance.

For example, in a case where an additionally selectable capacitance is designed to be 90% of the maximum capacitance obtained when all of the external electrodes are connected to the power lines, the desired capacitance can be obtained by setting the X to 9 times the Y. In this lamination order, the multilayer chip capacitors with a plurality of selectable capacitances can be easily designed.

Figure 4:
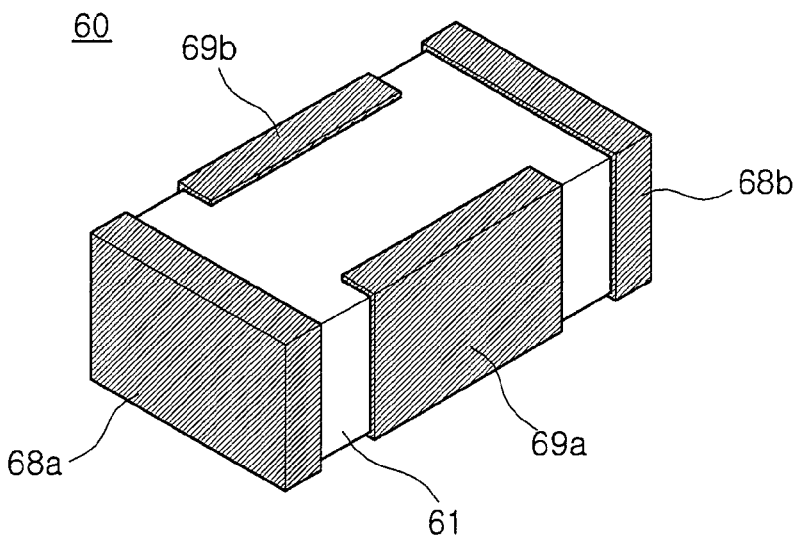
FIG. 4 is a perspective view illustrating a multilayer chip capacitor according to a second embodiment of the invention.

FIG. 4 illustrates a four-terminal multilayer chip capacitor according to a second embodiment of the invention. In the present embodiment, the four-terminal multilayer chip capacitor has external electrodes located differently from the four-terminal multilayer chip capacitor of the first embodiment.

Referring to FIG. 4, the multilayer chip capacitor 60 includes a capacitor body 61 where a plurality of dielectric layers 61' are laminated.

The capacitor body 61 of the present embodiment is formed of a rectangular parallelepiped structure having opposing first and second main surfaces and four side surfaces interposed therebetween. The first and second external electrodes 68a and 68b; 69a and 69b are formed across the four side surfaces.

That is, as shown in FIG. 4, the first external electrodes 68a and 68b are formed on the two opposing side surfaces of the body 61, respectively. The second external electrodes 69a and 69b are formed on the other opposing side surfaces, respectively. As a result, the first and second external electrodes 68a and 68b; 69a and 69b are arranged to have opposite polarities alternating along the four side surfaces.

Figure 5:
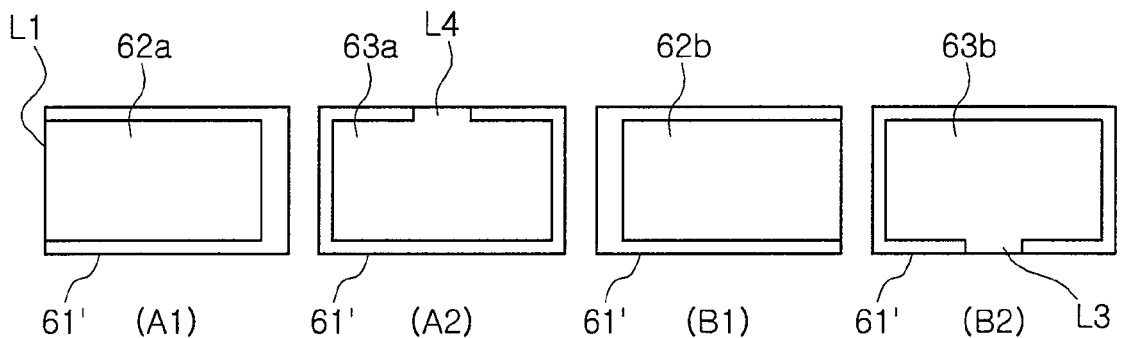
FIG. 5 is a plan view illustrating first and second internal electrodes applicable to the multilayer chip capacitor shown in FIG. 4.

To correspond to this arrangement of the external electrodes, the multilayer chip capacitor 60 may include first internal electrodes 62a and 62b and second internal electrodes 63a and 63b shown in FIG. 5. The plurality of first and second internal electrodes 62a, 63a, 62b, and 63b are arranged such that the internal electrodes 62b, 63b, 62a and 63a of different polarities alternate, while interposing a corresponding one of the dielectric layers 61'. The lamination order and number of the internal electrodes according to the present embodiment can be understood from the first embodiment.

A corresponding one of the first and second internal electrodes 62a, 63a, 62b, and 63b is selectively connected to one of the first and second external electrodes 68a and 68b; 69a and 69b having identical polarity through one lead L1, L4, L4, or L3, respectively.

In this connection structure, in a case where all of the first and second external electrodes 68a and 68b; 69a and 69b are connected to power lines, the internal electrodes of all of the groups (A1), (B1), (A2), and (B2) are activated to ensure that the multilayer chip capacitor exhibits predetermined capacitance, i.e., maximum capacitance.

However, in a case where at least one of the first and second external electrodes is not connected, the internal electrode connected to the at least one external electrode is not activated. This allows the multilayer chip capacitor to have different capacitance. As described above, capacitance can be adjusted by selectively connecting the external electrodes to the power lines. This can be easily understood with reference to FIGS. 3A to 3D.

The present invention can be easily applicable to not only the four terminal structure but also a six or more terminal structure.

Figure 6:
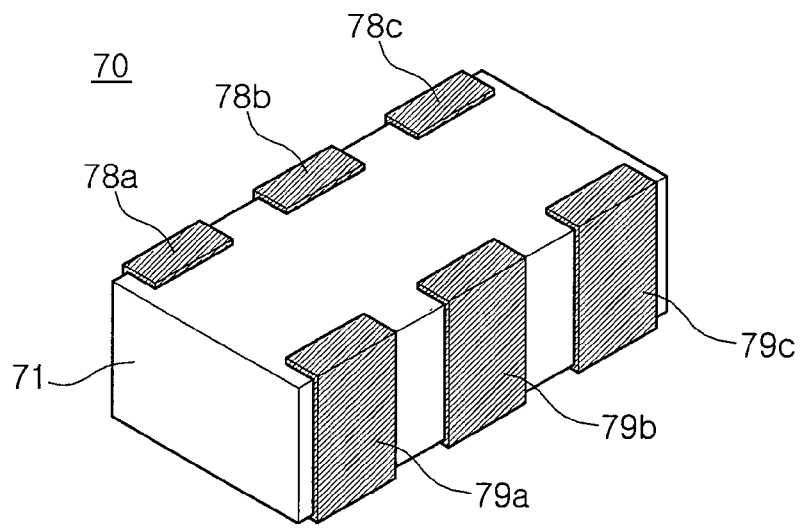
FIG. 6 is a perspective view illustrating a multilayer chip capacitor according to a third embodiment of the invention.

FIG. 6 is a perspective view illustrating a six terminal multilayer chip capacitor according to a third embodiment of the invention.

Referring to FIG. 6, the multilayer chip capacitor 70 of the present embodiment includes a capacitor body 71 where a plurality of dielectric layers 71' are laminated.

As shown, the multilayer chip capacitor 70 includes three first external electrodes 78a, 78b, and 78c and three second external electrodes 79a, 79b, and 79c formed on both opposing side surfaces to be electrically insulated from each other.

The multilayer chip capacitor of the present embodiment may include first and second internal electrodes divided into three groups 72a and 73a; 72b and 73b; 72c and 73c.

Figure 7:
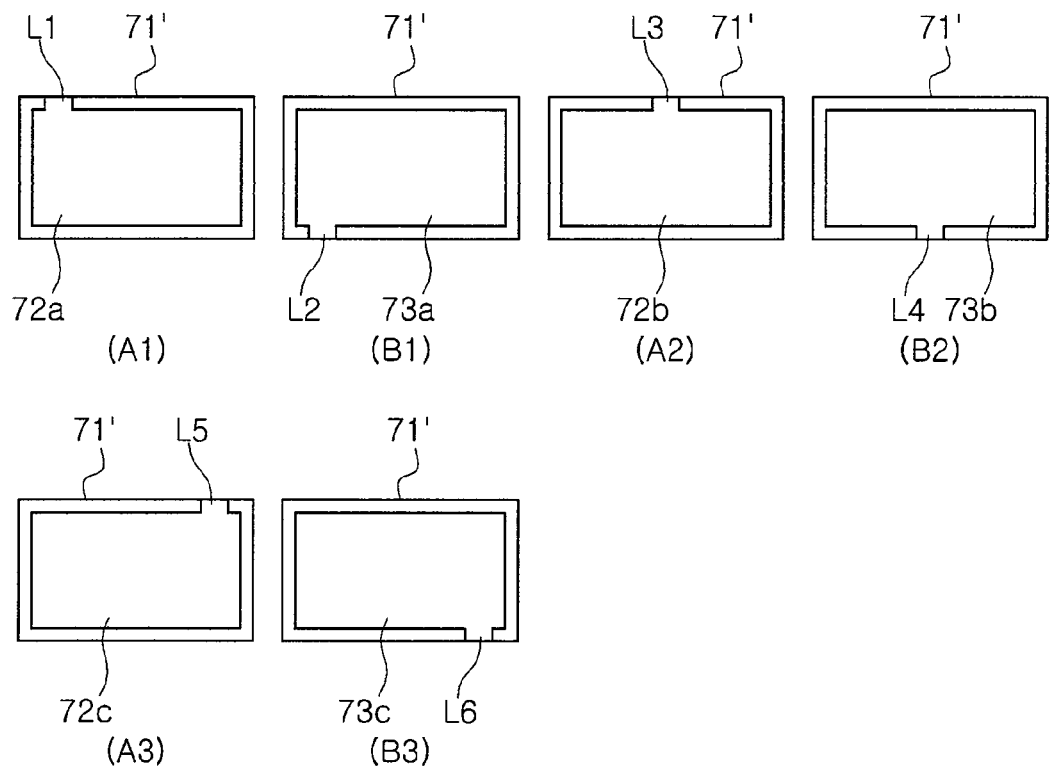
FIG. 7 is a plan view illustrating first and second internal electrodes applicable to the multilayer chip capacitor shown in FIG. 6 according to an exemplary embodiment of the invention.

As shown in FIG. 7, the first internal electrodes 72a, 72b, and 72c of each of the groups are connected to the first external electrodes 78a, 78b, and 78c by a corresponding one of leads L1, L3, and L5, respectively. In a similar manner, the second internal electrodes 73a, 73b, and 73c of the each group are connected to the second external electrodes 79a, 79b, and 79c by a corresponding one of leads L2, L4, and L6, respectively.

As described above, similarly to the previous embodiments, each of the first internal electrodes 72a, 72b, and 72c belonging to the each group is connected to a corresponding of the first external electrodes and each of the second internal electrodes 73a, 73b, and 73c belonging to the each group is connected to a corresponding one of the second external electrodes. The internal electrodes of the each group can be independently activated according to connection between the corresponding external electrodes and the power lines. Therefore, capacitance can be tuned to a desired value by selectively connecting the external electrodes to the power lines.

Figure 8:
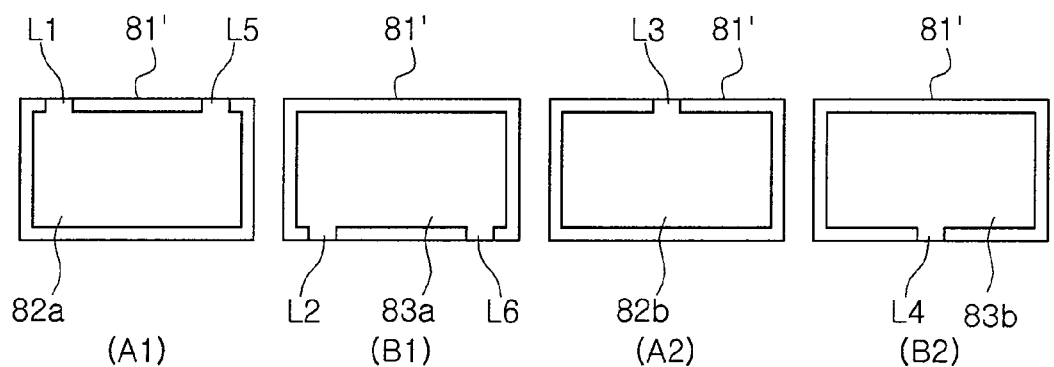
FIG. 8 is a plan view illustrating first and second internal electrodes applicable to the multilayer chip capacitor shown in FIG. 6 according to another exemplary embodiment of the invention.

First and second internal electrodes 82a, 82b, and 82c; 83a, 83b, and 83c shown in FIG. 8 are divided into two groups according to external electrodes connected thereto. The first internal electrodes 82a of group (A1) are connected to two of the external electrodes 78a and 78c through two leads L1 and L5, respectively and the second internal electrode 83a of group (B1) are connected to other two of the external electrodes 79a and 79c through two leads L2 and L4, respectively. Meanwhile, the first internal electrode 82b of group (A2) is connected to one of the external electrodes 78b through one lead L2 and the second internal electrode 83b of group (B2) is connected to one of the second external electrodes 79b through one lead L3.

In the internal electrode structured in FIG. 8, unlike the previous embodiment, some portions of the internal electrodes are connected to two of the external electrodes, respectively, or connected to the external electrodes of a different number from the external electrodes connected to the internal electrodes of another group. Even with this structure, the internal electrodes of the each group can be independently activated by the some portions of external electrodes. Therefore, only the some portions of internal electrodes are allowed to serve to improve capacitance, thereby adequately tuning capacitance. This enables capacitance to be adjusted by connection between the external electrodes and the power lines, as aimed in the present invention.

As set forth above, according to exemplary embodiments of the invention, external electrodes are selectively connected to power lines to change capacitance of the capacitor when a multilayer chip capacitor is mounted. Accordingly, a manufacturer can provide a multilayer chip capacitor with various capacitances as one chip. Also, a user does not need to purchase diverse multilayer chip capacitors separately according to capacitances required, but can easily determine desired capacitance only by connection between the external electrodes and the power lines.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor capable of tuning capacitance, comprising:
  a capacitor body where a plurality of dielectric layers are laminated;
  a plurality of pairs of first and second internal electrodes arranged alternately such that the internal electrodes of different polarities oppose each other, while interposing a corresponding one of the dielectric layers in the capacitor body; and a plurality of pairs of first and second external electrodes formed on a surface of the capacitor body, wherein the first and second internal electrodes comprise a plurality of groups each including at least one pair of the first and second internal electrodes, and the first and second internal electrodes of each of the groups are connected to the pairs of the first and second external electrodes different from one another, respectively, wherein a corresponding one of the pairs of the first and second external electrodes is selectively connected to power lines so that the multilayer chip capacitor has at least two different capacitances.

2. The multilayer chip capacitor of claim 1, wherein the pair of the first and second internal electrodes belonging to the each group is different in number.

3. The multilayer chip capacitor of claim 1, wherein the first and second internal electrodes belonging to the each group comprise at least two pairs of the first and second internal electrodes, wherein the two pairs of the first and second internal electrodes belonging to one of the groups are stacked alternately with the two pairs of the first and second internal electrodes belonging to another one of the groups, respectively.

4. The multilayer chip capacitor of claim 1, wherein the first and second internal electrodes belonging to the each group comprise at least two pairs of the first and second internal electrodes, wherein the two pairs of the first and second internal electrodes belonging to one of the groups are stacked successively and the two pairs of the first and second internal electrodes belonging to another one of the groups are stacked successively thereon.

5. The multilayer chip capacitor of claim 1, wherein a corresponding one of the first and second internal electrodes belonging to the each group is connected to only one of the external electrodes having identical polarity.

6. The multilayer chip capacitor of claim 1, wherein the first and second external electrodes are formed on both opposing surfaces of the capacitor body.

7. A method of tuning capacitance of a multilayer chip capacitor, the method comprising:

providing a capacitor comprising first and second internal electrodes arranged alternately, while interposing a corresponding one of dielectric layers, and a plurality of first and second external electrodes, wherein the first and second internal electrodes comprise a plurality of groups each including at least one pair of first and second internal electrodes, and the first and second internal electrodes of each of the groups are connected to different pairs of the first and second external electrodes from one another, respectively, wherein a corresponding one of the pairs of the first and second external electrodes is selectively connected to power lines so that the multilayer chip capacitor has at least two different capacitances;

selecting the first and second external electrodes corresponding to a desired one of the at least two capacitances; and mounting the multilayer chip capacitor on a printed circuit board such that the selected first and second external electrodes are connected to the power lines provided on the printed circuit board.

8. The method of claim 7, wherein the mounting the multilayer chip capacitor on a printed circuit board comprises:

providing a printed circuit board including a plurality of first and second mounting pads corresponding to the plurality of the first and second external electrodes, respectively and first and second power lines, wherein the first and second power lines are connected to only the first and second mounting pads corresponding to the selected first and second external electrodes out of the plurality of first and second mounting pads, and connecting the first and second external electrodes of the multilayer chip capacitor to the plurality of first and second mounting pads, respectively.

9. The method of claim 7, wherein the selecting the first and second external electrodes corresponding to a desired one of the at least two capacitances comprises selecting the first and second external electrodes excluding at least one of the plurality of the first and second external electrodes.

* * * * *